United States Patent [19]

Nitta

[11] Patent Number: 5,265,214
[45] Date of Patent: Nov. 23, 1993

[54] FILLING PROCESSING APPARATUS AND METHOD

[75] Inventor: Takeshi Nitta, Shiga, Japan

[73] Assignee: Daikin Industries, Ltd., Japan

[21] Appl. No.: 837,593

[22] Filed: Feb. 20, 1992

Related U.S. Application Data

[63] Continuation of Ser. No. 236,955, Aug. 26, 1988, abandoned.

[30] Foreign Application Priority Data

Aug. 28, 1987 [JP] Japan .................. 62-215909

[51] Int. Cl.$^5$ .................................. G06F 3/14
[52] U.S. Cl. ............................ 395/122; 395/121; 395/133; 395/135
[58] Field of Search ............... 340/747, 750, 798, 728, 340/734; 382/46; 395/121, 122, 133, 135, 141

[56] References Cited

U.S. PATENT DOCUMENTS

| | | | |
|---|---|---|---|
| 4,608,653 | 8/1986 | Setoguchi | 364/522 |
| 4,625,289 | 11/1986 | Rockwood | 364/522 |
| 4,646,078 | 2/1987 | Knierim et al. | 340/750 |
| 4,684,990 | 8/1987 | Oxley | 358/183 |
| 4,775,946 | 10/1988 | Anjyo | 364/522 |
| 4,812,988 | 3/1989 | Duthuit | 364/522 |
| 4,821,213 | 4/1989 | Cline et al. | 364/522 |

Primary Examiner—Phu K. Nguyen
Attorney, Agent, or Firm—Beveridge, DeGrandi, Weilacher & Young

[57] ABSTRACT

A filling processing apparatus in which the most significant plane of a depth buffer serves as a plane for storing data of discriminating a bore polygon, and the depth data of a contour polygon are stored, as masked by the depth data of the bore polygon, in the depth buffer, whereby a hidden surface removal and a filling processing are executed.

4 Claims, 4 Drawing Sheets

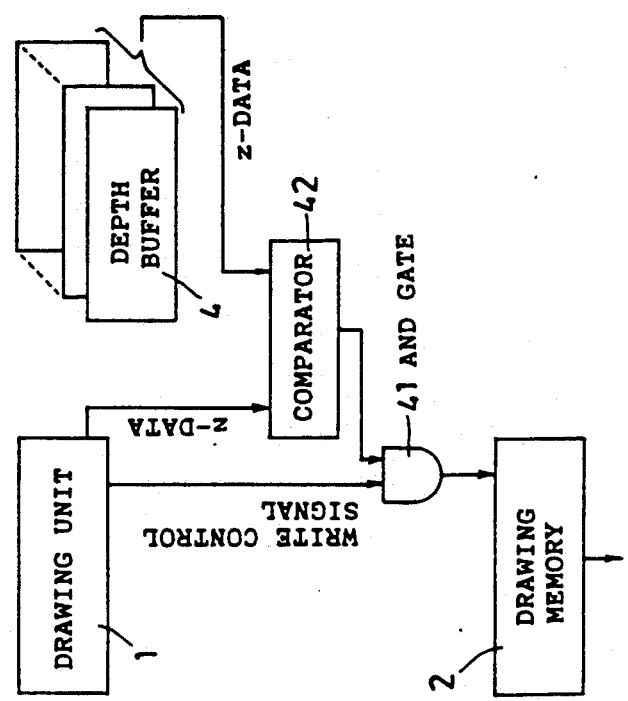
Fig. 3
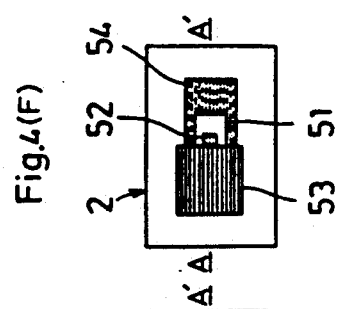 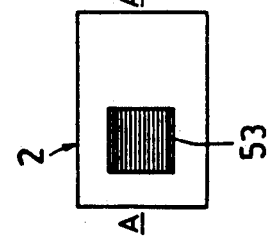 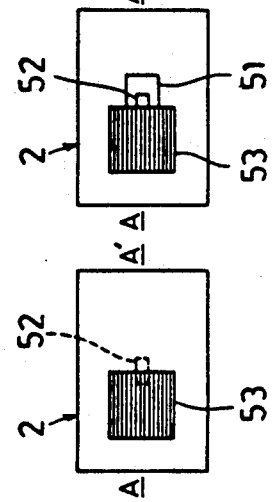 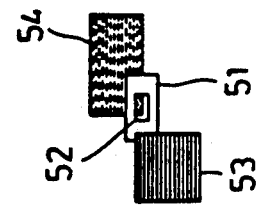

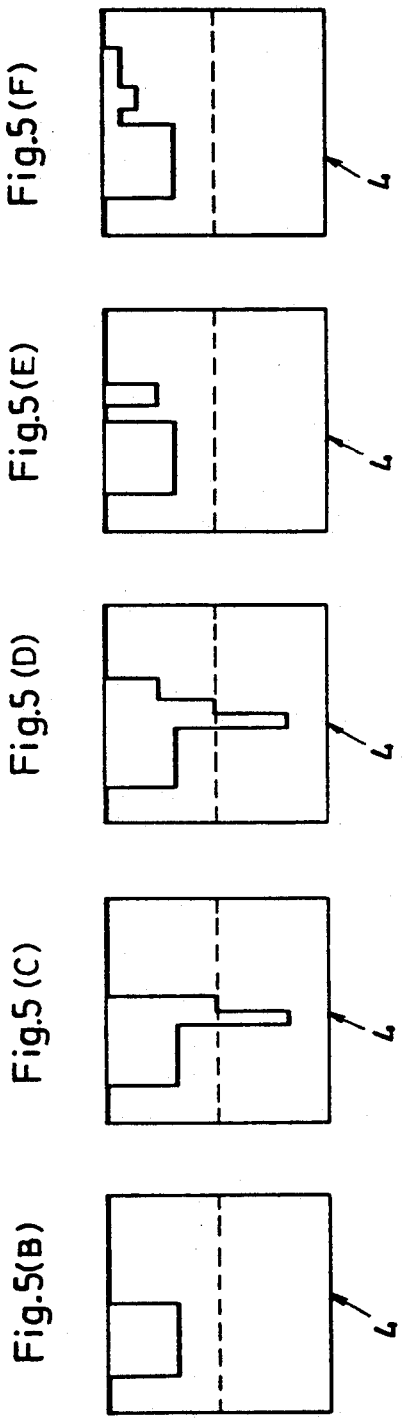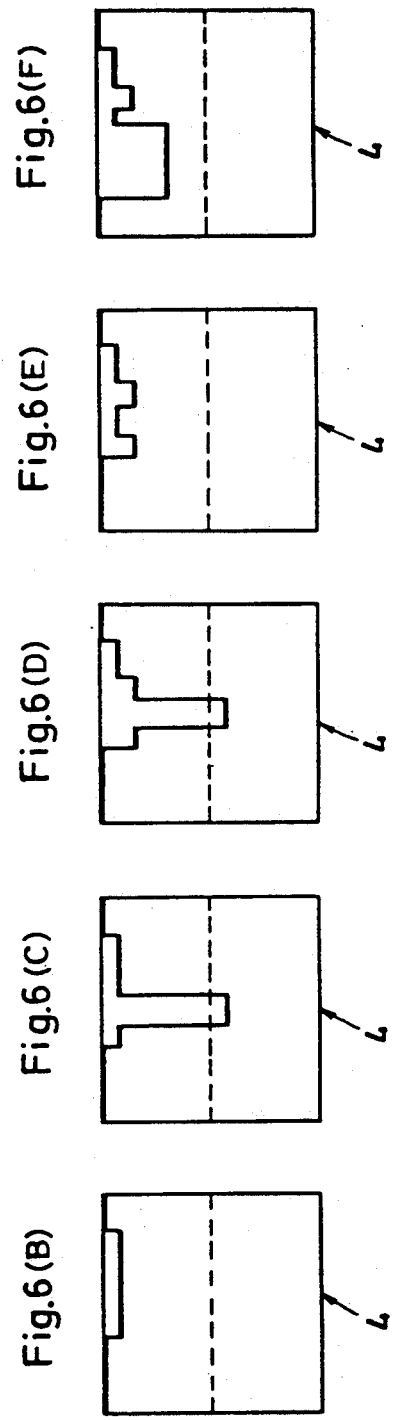

FILLING PROCESSING APPARATUS AND METHOD

This application is a continuation of application Ser. No. 07/236,955, filed Aug. 26, 1988, now abandoned.

BACKGROUND OF THE INVENTION

The present invention relates to a filling processing apparatus and method, and more particularly, to a filling processing apparatus and method capable of executing filling processing based on entered figure data while filling processing is not executed on a preset area (hereinafter referred to as a boring processing).

Conventionally, there has been proposed and widely used a graphic display apparatus in which at least apex data of polygons are received to obtain the boundary line data of the polygons and filling processing is executed on the areas divided by such boundary lines with desired colors to achieve a display having both quantitative and qualitative feelings.

The graphic display apparatus having the arrangement above-mentioned can be applied even though the figure to be actually displayed is not a polygon but a figure composed of, for example, circles, irregular curved lines and the like. More specifically, the figure to be displayed is approximately divided to a plurality of polygons, and the filling processing above-mentioned is executed on each of the polygons to achieve a display having both quantitative and qualitative feelings. Now, the description will be made with reference to a block diagram in FIG. 7.

A host processor (not shown) supplies point data to a drawing unit 61, which, in turn, carries out necessary interpolation operations and supplies the interpolation data to a drawing memory 62. Color index data and the like are then written to the addresses concerned. The figure is then visually displayed on a CRT display device or the like 63. The interpolation data generated by the drawing unit 61 are written in a depth buffer 64. There is then supplied to the drawing memory 62 a write enable signal of the frontmost depth data, out of the depth data of the same plane coordinates. Thus, pixel data with hidden surfaces removed are stored in the drawing memory 62.

Accordingly, even for a figure having a relatively complicated shape, the host processor can recognize it as an assembly of a plurality of polygons each having a relatively simple shape, and filling processing can be executed on each of the polygons. Thus, filling processing can be executed on figure having any shaped. When the original figure is simple, the host processor can recognize it as an assembly of a small number of polygons. Accordingly, the entire processing time required can be short. However, when the original figure is complicated, for example when the original figure includes curved lines, it is required that the host processor recognize it as an assembly of a large number of polygons. This results in long processing time required as a whole.

Further, there are instances where, as shown in FIG. 8 (A), a figure in the form of a triangle is to be filled except for a quadrilateral area defined therein, instead of the whole triangular figure. To execute such filling with the graphic display apparatus above-mentioned, it is proposed to recognize the whole figure as an eleven-cornered figure by drawing an imaginary line connecting the intermediate point of an arbitrary side of the triangle to the intermediate point of the corresponding side of the quadrilateral, and to fill this eleven-cornered figure in its entirety. In this case, however, the number of apexes becomes eleven although the original figure has seven apexes. This increases the number of sides for which interpolation operation is to be executed, thereby to lengthen the entire processing time. Further, since the eleven-cornered figure is a concave polygon, this figure cannot undergo simple convex-polygon filling to be executed in a short period of time. Therefore, the entire processing time required is further lengthened.

In FIG. 8 (C), the polygon above-mentioned is divided into two polygons, and a filling processing is executed on each of the polygons thus divided. This is superior to the processing in FIG. 8 (B) in that the number of apexes of the polygon to be processed is decreased. However, the number of polygons to be processed is increased, and concave-polygon filling processing is still applied. As a whole, processing in FIG. 8 (C) takes a processing time subsantially equal to that required for processing as described with respect to FIG. 8 (B).

In FIG. 8 (D), the polygon above-mentioned is divided into four polygons such that all the polygons thus divided are a convex polygon. This is advantageous in that no concave-polygon processing is required. However, the number of polygons to be processed is remarkably increased. As a whole, the processing in FIG. 8 (D) cannot reduce extensively the processing time required. In particular, when the figure not to be filled incorporates curved lines such as a circular, figure the number of polygons to be processed is remarkably increased since the figure is approximated by a polygon. The problem of lengthened processing time is further prominent.

In any of the procedures above-mentioned, when the number of figures not to be filled is increased, the number of apexes of the polygon to be processed or the number of polygons to be processed is accordingly increased. As a whole, the processing time required is remarkably increased.

SUMMARY OF THE INVENTION

It is an object of the present invention to execute, in a simple manner and in a short period of time, a hidden surface removal and a filling processing of a figure assembly containing figures which should not be filled.

It is a further object of the present invention to prevent an increase in the number of polygon sides to be interpolated in a filling processing.

It is another object of the present invention to execute a hidden surface removal and a filling processing only with a convex-polygon processing.

It is a still further object of the present invention to execute a hidden surface removal and a filling processing without polygon division.

It is still another object of the present invention to shorten the time required for a hidden surface removal and a filling processing, regardless of an increase in the number of figures which should not be filled.

To achieve the objects above-mentioned, the filling processing apparatus in accordance with the present invention includes:

figure data discriminating means for setting different values to a predetermined number of upper bits of the depth data dependent on figure data to be filled and figure data not to be filled, out of entered figure data; and depth data resetting means for resetting the values of the predetermined number of upper bits of the depth data, to the initial state, after hidden surface removal has been executed based on the figure data not to be filled.

In accordance with the filling processing apparatus having the arrangement above-mentioned, when executing a hidden surface removal by the depth buffer and a filling processing based on entered figure data for the filling processing, the figure data discriminating means sets different values to a predetermined number of upper bits of the depth data depending upon whether the figure data is not to be filled or the figure data is to be filled. This causes figure data other than the figure data not to be filled, to be masked by the figure data not to be filled when the plane coordinates data and the depth data are supplied to the depth buffer. Then, after the hidden surface removal has been executed, the predetermined number of upper bits of the depth data are reset to the initial state by the depth data resetting means. This causes the depth data of the figure not to be filled, to have values which are located rearward by the predetermined number of upper bits. When a hidden surface removal is then executed on other figures, such hidden surface removal can be executed without any influence by the figure not to be filled.

More specifically, it is now supposed that a relatively large polygon area is required to be filled and this polygon incorporates a polygon area which should not be filled. In figure data supplied from a host processor or the like, the depth data of the polygon area not to be filled have special data at a predetermined number of upper bits thereof. Accordingly, the depth data of the polygon area not to be filled will be located in the front side with respect to the depth data of the relatively large polygon area to be filled. When the depth data and the plane coordinates data of both polygon areas are supplied to the depth buffer, the relatively large polygon area is masked by the polygon area not to be filled. Thereafter, the predetermined number of upper bits of the depth data of the area not to be filled are reset to the original state. This prevents the depth data of the area not to be filled from masking the other polygon area to be filled.

When the number of bits for discriminating figure data is 1, a decrease in resolution for hidden surface removal by the depth buffer can be minimized. That is, when the number of bits in the depth buffer is m, only the most significant bit is used for discrimination of polygon area and the remaining (m−1) bits are used for representing depth data. Accordingly, such arrangement assures a depth resolution of $2^{m-1}$.

In this case, the most significant bits of the depth data of the figure not to be filled have values which are located at the front side with respect to the normal depth data setting max. precision $2^{m-1}$ in the depth buffer, i.e., "1" for the right-hand coordinates system, but the depth resolution above-mentioned can be achieved.

When the upper bits of the depth data can be used to selectively store the depth data or the figure discrimination data, the depth data can be set to all bits of the depth buffer when a boring processing is not required. This enhances the depth resolution.

Other objects, advantages and novel characteristics of the present invention will be apparent from the following description.

BRIEF DESCRIPTION OF THE DRAWINGS

FIG. 3 is a block diagram illustrating an arrangement for generating a write control signal to be supplied to a drawing memory;

FIGS. 4(A), 4(B), 4(C), 4(D), 4(E), and 4(F) are useful in understanding the operations of the drawing memory in hidden surface removal and filling processing;

FIGS. 5(B), 5(C), 5(D), 5(E), and 5(F) illustrate variations of depth data in a depth buffer corresponding to the drawing memory in FIG. 4 taken along the line A-A' thereof;

FIGS. 6(B), 6(C), 6(D), 6(E), and 6(F) illustrate variations of the depth depth data in the depth buffer in a hidden surface removal and a filling processing when the processing order is changed;

DETAILED DESCRIPTION OF THE PREFERRED EMBODIMENTS

Figure 1:
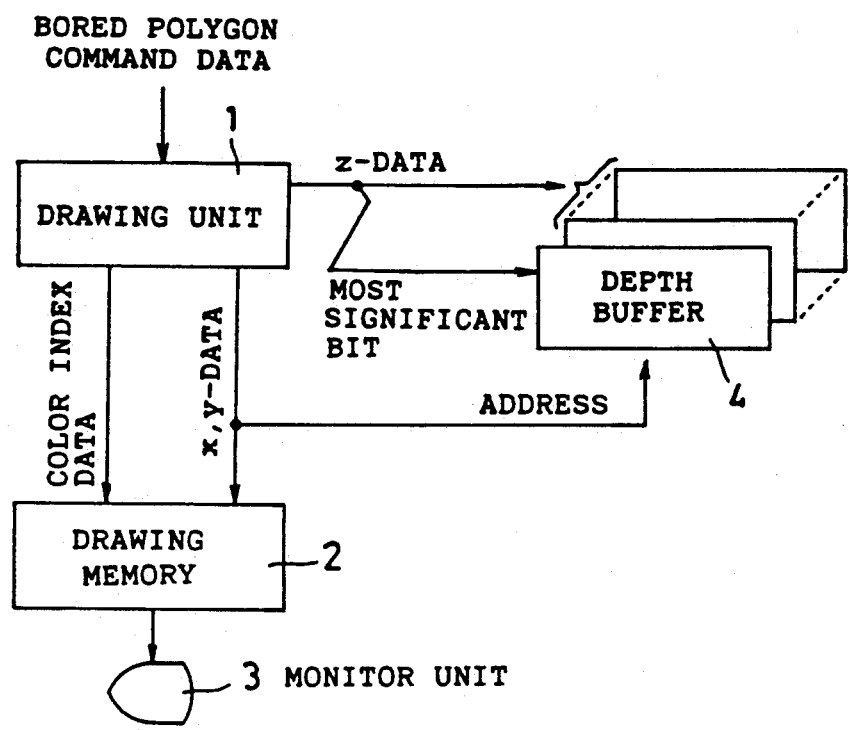
FIG. 1 is a schematic diagram of the of main portions of a filling apparatus in accordance with the present invention.

FIG. 1 is a schematic view of the main portions of a filling apparatus in accordance with the present invention. The filling apparatus comprises:

a drawing unit 1 for carrying out linear interpolation operations and the like based on bored polygon command data supplied from a host processor or the like (not shown) and for generating pixel data to be filled, based on the results of the interpolation operations;

a drawing memory 2 for writing the pixel data to be filled, supplied from the drawing unit 1 (color index data and the like for plane coordinates) under control of a write control signal;

a monitor unit 3 for achieving a visual display based on the contents of the drawing memory 2; and a m-plane depth buffer 4 for receiving interpolation operation data supplied from the drawing unit 1 and for holding depth data corresponding to the plane coordinates data.

The filling apparatus above-mentioned employs, in this embodiment, the right-hand coordinates system in which the front-side coordinates values are greater than the rear-side coordinates values.

Figure 2:
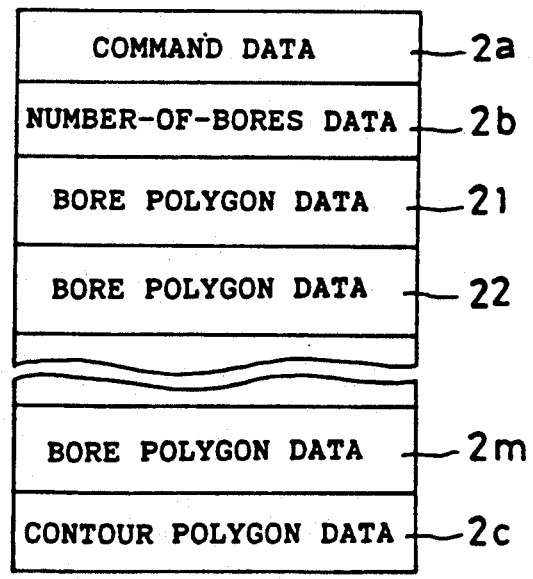
FIG. 2 provides an example of the format of bored polygon command data.
Figure 7:
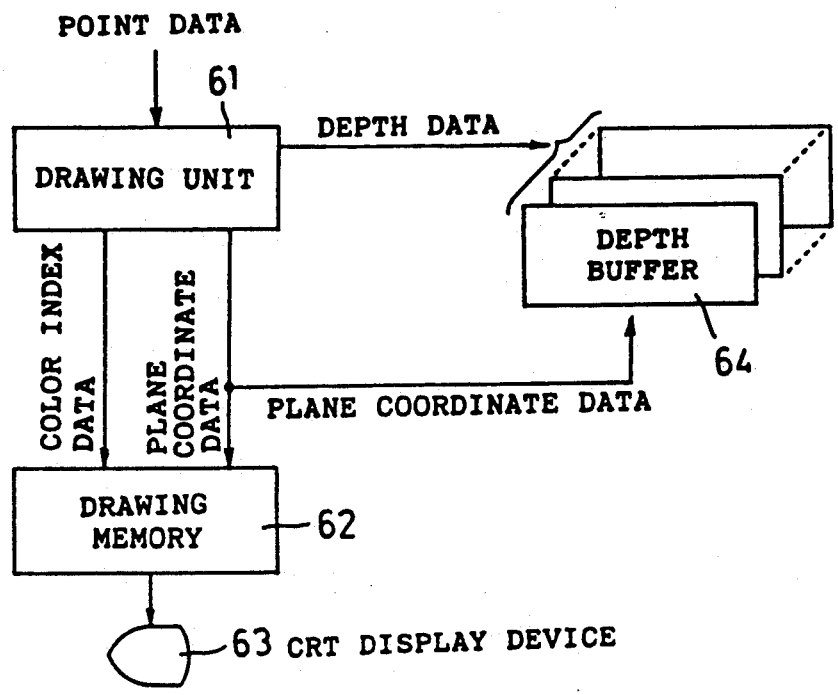
FIG. 7 is a schematic diagram of a conventional filling apparatus.
Figure 8A:
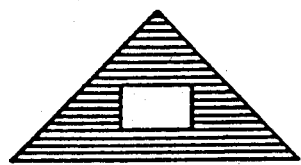
FIGS. 8(A), 8(B), 8(C), and 8(D) illustrate conventional boring processing methods.
Figure 8B:
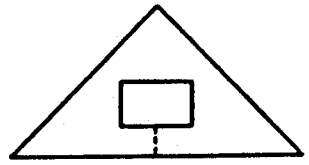
Figure 8C:
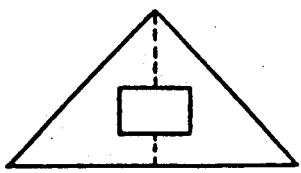
Figure 8D:
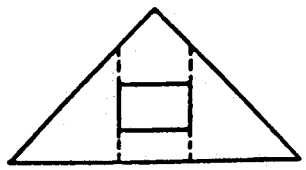

FIG. 2 shows an example of the format of bored polygon command data, which data contain command data 2a representing that a filling processing is to be executed on a bored polygon, the number-of-bores data 2b, bore polygon data 21, 22, . . . 2m, and contour polygon data 2c.

More specifically, the drawing unit 1 carries out interpolation operations based on the bore polygon data 21, 22, 2m and the contour polygon data 2c out of the bored polygon command data. Then, the drawing unit 1 generates pixel data to be filled corresponding to the respective polygon data (x- and y-data as plane coordinates data, z-data as depth data and color index data). The x-, y- and z-data thus generated are supplied to the depth buffer 4, while the x- and y-data and the color index data are supplied to the drawing memory 2. Then, "1" data are written only in that plane of the depth buffer 4 corresponding to the most significant bits of the z-data for a bore polygon. After filling processing for the bored polygon has been finished, only the "1" data of that plane of the depth buffer 4 corresponding to the most significant bits of the z-data are reset to the initial setting value which is "0" data.

Based on the x-, y- and z-data supplied from the drawing unit 1, the depth buffer 4 holds the z-data corresponding to the x- and y-data. The depth buffer 4 has m planes as a whole. One plane corresponding to the most significant bit holds data for identifying whether or not the target figure is a bore polygon (which data are set to "1" for a bore polygon and to "0" for polygon than a bore polygons other). The remaining $(m-1)$ planes hold z-data as depth data. Accordingly, the z-data of each polygon are stored, as $(m-1)$-bit data, in the depth buffer 4. Only in a bore polygon are, the most significant bits set to "1", and data obtained by adding $2^{m-1}$ to the depth data represented by the $(m-1)$-bit data above-mentioned, stored in the depth buffer 4.

The depth buffer 4 supplies a write enable signal "1" to the drawing memory 2, only when the m-bit data including the z-data generated in the drawing unit 1 and the most significant bit data, are greater than the m-bit data previously stored correspondingly to the x- and y-data concerned. Otherwise, the depth buffer 4 supplies a write inhibit signal "0" to the drawing memory 2.

More specifically as shown in FIG. 3, supplied to an AND gate 41 are:
 (a) a write control signal supplied from the drawing unit 1 (the write enable signal "1" supplied at timings at which pixel data to be filled are supplied to the drawing memory 2); and
 (b) a comparison result signal representing the result in which the z-data supplied from the drawing unit 1 have been compared with the z-data read out from the depth buffer 4 by a comparator 42.

The AND gate 41 supplies data as a write control signal to the drawing memory 2. When the write enable signal is supplied to the drawing memory 2, there are written in the depth buffer 4 the $(m-1)$-bit data except the most significant bit data, out of the m-bit data generated in the drawing unit 1.

The following will discuss the operation of the filling apparatus having the arrangement above-mentioned.

FIG. 4 (A) shows an example in which a quadrilateral 51 as a contour polygon incorporating a quadrilateral 52 as a bore polygon is located between two solid quadrilaterals 53, 54, and in which the quadrilaterals 51, 53, 54 are to be displayed as filled. In this case, polygon command data representing that the solid quadrilateral 53 is to be displayed as filled, are supplied to the drawing unit 1. The drawing unit 1, in turn, carries out necessary interpolation operations and the like to generate x-, y- and z-data and color index data. A write control signal is generated based on the z-data corresponding to the x- and y-data thus generated and on the z-data read out from the depth buffer 4. The write control signal thus generated is supplied to the drawing memory 2 to control the writing of the color index data corresponding to the x- and y-data supplied from the drawing unit 1 to the drawing memory 2.

In this example, the quadrilateral 53 is first filled. Accordingly, the color index data of the entire area of the quadrilateral 53 are written, as they are, in the drawing memory 2 (See FIG. 4 (B)), and the z-data of the quadrilateral 53 are stored in the depth buffer 4 (See FIG. 5 (B)).

Next, supplied to the drawing unit 1 are the bored polygon command data for the quadrilateral 51 incorporating the quadrilateral 52. The drawing unit 1 identifies the data of the quadrilateral 52 based on the storing position of the polygon data in the bored polygon command data, and executes interpolation operations and the like to generate x- and y-data. The drawing unit 1 also generates the "1" data to be set to the most significant bit of the depth buffer 4. The "1" data thus generated are supplied to the depth buffer 4. Simultaneously, the color index data corresponding to the x- and y- data are supplied to the drawing memory 2. In this case, however, the color index data are those for the bore polygon, and therefore do not particularly exist. Accordingly, the color index data for the bore polygon are not written in the drawing memory 2 (See FIG. 4 (C)). However, when data are written only into the most significant bit with data writing into the lower $(m-1)$ bits inhibited in the depth buffer 4, the z-data are stored as added by $2^{m-1}$ in the depth buffer 4 (See FIG. 5 (C)). After the processing for the quadrilateral 52 as the bore polygon has been thus finished, a filling processing starts for the quadrilateral 51 as the contour polygon. In this example, the z-data for the quadrilateral 51 are smaller than the depth buffer values for the quadrilateral 52, and also smaller than the z-data for the quadrilateral 53. Accordingly, only for that area of the quadrilateral 51 which does not overlap the quadrilaterals 52, 53, the color index data are written in the drawing memory 2 (See FIG. 4 (D)) and the z-data are written in the depth buffer 4 (See FIG. 5 (D)).

After processing has been executed based on the bored polygon command data, the drawing unit 1 changes the "1" data in the most significant plane of the depth buffer 4, to "0" (See FIG. 5 (E)). At this time, the result data of hidden surface removal stored in other planes than the most significant plane are reserved as they are.

Finally, the quadrilateral 54 is to be filled. Here, a hidden surface removal is to be executed based on the contents of the depth buffer 4 shown by FIG. 5 (E). Accordingly, only for that area of the quadrilateral 52 which does not overlap the quadrilateral 53 and for that area of the quadrilateral 54 which does not overlap the quadrilaterals 51, 53, are color index data written in the drawing memory 2 (FIG. 4 (F)) and the contents concerned of the depth buffer 4 are changed (See FIG. 5 (F)).

In summary, when filling processing is to be carried out on all the quadrilaterals 51, 53, 54 with their hidden surfaces readily removed by the depth buffer 4, and the quadrilateral 52 is to be further processed, the "1" data are written only into the most significant plane of the depth buffer 4. In such state, the quadrilateral 51 is processed, after which only the "1" data in the most significant plane are changed to "0". With only such processing, hidden surface removal and filling processing can be executed on all the quadrilaterals including the bored quadrilateral. As a whole, the processing can be simplified and executed in a shortened period of time.

FIG. 6 shows variations of the contents of the depth buffer 4 when hidden surface removal is executed for the quadrilateral 54, the bored quadrilateral 51 and the quadrilateral 53, in this order. With this processing order, the depth buffer 4 can finally obtain contents equal to those in FIG. 5 (F). Accordingly, the color index data written in the drawing memory 2 are also finally equal to those in FIG. 4 (F).

As apparent from the foregoing, hidden surface removal and filling processing can be executed on a plurality of quadrilaterals including a bored quadrilateral, without any influence by the quadrilateral drawing order.

Accordingly, not only when bored polygons and normal polygons are present, but only when a plurality of bored polygons are present, hidden surface removal and filling processing can be readily and securely executed merely by repeating convex-polygon filling processing as often as necessary. As a whole, the processing time can be remarkably shortened as compared with a conventional system. In particular, when the contour polygon incorporates a plurality of bore polygons, the entire processing time can be much shortened as compared with a conventional system.

When only the "1" data in the most significant plane of the depth buffer 4 are to be changed to "0" data, the pixel data corresponding to the entire area of the contour polygon are set to "0", enabling the entire range of the most significant plane to be reset to the initial state.

The most significant plane of the depth buffer 4 can be reset to the initial state by other methods than the method above-mentioned. For example, there may be applied a method of writing the "0" data into the entire range of the most significant plane, or a method of writing the "0" data into the area corresponding to the bore polygon. However, when considering a substantial increase in the number of bore polygons, it is most preferable to use the method of setting the pixel data corresponding to the entire area of the contour polygon, to "0". This method can shorten the processing time required.

The description has been made where both non-bored polygons and bored polygons are quadrilateral. However, the apparatus and method of the present invention can also be applied for a hidden surface removal and a filling processing of a plurality of figures containing an arbitrary contour polygon which incorporates an arbitrary bore polygon. Further, similar processings can also be executed on a figure assembly in which the contour polygon incorporates two or more bore polygons.

It is also possible to store additional data for a bore polygon into a plurality of upper planes of the depth buffer 4. Alternatively, it is also possible to arrange the upper planes of the depth buffer 4 such that these planes are used for selectively storing additional data for a bore polygon or depth data to enhance the resolution in the depthwise direction.

Further, the apparatus of the present invention may be arranged such that filling processing is executed with the "0" data written into a predetermined number of upper bits for the bore polygon with these bits being reset to "1" after filling processing has been completed. This permits the apparatus to accommodate a left-hand coordinates system.

What is claimed is:

1. A polygon drawing method which executes filling processing based upon figure data for a polygon including a bore portion therein, said figure data being entered by performing hidden surface removal utilizing a depth buffer, said depth buffer storing depth data for each pixel of said polygon and having a plurality of data planes which correspond to display screen size, said depth data for each pixel having bits, each of said bits being associated with one of said depth buffer planes, said drawing method comprising the steps of:

entering said figure data comprising said depth data;

setting a specific bit of depth data corresponding to pixels which belong to said bore portion to a predetermined value, said specific depth data bit being indicative of a deepest plane of said plurality of planes;

executing hidden surface removal with said depth buffer for said polygon including said bore portion; and after said hidden surface removal has been executed, changing said predetermined value of said specific depth data bit from said predetermined value to a value which said bit had before said step of setting said bit to said predetermined value.

2. A polygon drawing apparatus which executes filling processing based upon figure data for a polygon including a bore portion therein, said figure data being entered by performing hidden surface removal utilizing a depth buffer, said depth buffer storing depth data for each pixel of said polygon and having a plurality of data planes which correspond to display screen size, said depth data for each pixel having bits, each of said bits being associated with one of said depth buffer planes, said drawing apparatus comprising:

depth data setting means for setting a specific bit of said depth data which corresponds to a pixel which belongs to said bore portion to a predetermined value, said specific depth data bit being indicative of a deepest plane of said plurality of planes;

depth data resetting means for changing said specific depth data bit from said predetermined value to a value which said specific bit had before said bit was set to said predetermined value by said depth data setting means; and control means for controlling said depth data setting means and said depth data resetting means so that said depth data setting means performs said setting of said bit before executing said filling processing for said polygon including said bore portion, and said depth data resetting means performs said changing of said specific depth data bit after said filling processing for said polygon including said bore portion has been completed.

3. A polygon drawing apparatus as set forth in claim 2, wherein said one specific depth data bit is the most significant bit and has the value "1".

4. A polygon drawing apparatus as set forth in claim 2, wherein said specific bit is used for selectively storing depth data or said predetermined value.

* * * * *